(12) United States Patent
Macwan et al.

(10) Patent No.: US 11,329,891 B2
(45) Date of Patent: May 10, 2022

(54) METHODS AND APPARATUS FOR MANAGING TELECOMMUNICATION SYSTEM DEVICES

(71) Applicant: Vonage Business Inc., Holmdel, NJ (US)

(72) Inventors: Sanjay Macwan, Marlboro, NJ (US); Deepak Ottur, Belle Mead, NJ (US); Murali Ramsunder, Basking Ridge, NJ (US)

(73) Assignee: Vonage Business Inc., Holmdel, NJ (US)

( * ) Notice: Subject to any disclaimer, the term of this patent is extended or adjusted under 35 U.S.C. 154(b) by 0 days.

(21) Appl. No.: 16/986,850

(22) Filed: Aug. 6, 2020

(65) Prior Publication Data

US 2021/0044494 A1 Feb. 11, 2021

Related U.S. Application Data

(60) Provisional application No. 62/926,246, filed on Oct. 25, 2019, provisional application No. 62/884,378, filed on Aug. 8, 2019.

(51) Int. Cl.
*H04L 41/00* (2022.01)
*H04L 41/0853* (2022.01)
*H04L 41/0813* (2022.01)
*G06V 20/20* (2022.01)

(52) U.S. Cl.
CPC ............ *H04L 41/32* (2013.01); *G06V 20/20* (2022.01); *H04L 41/0813* (2013.01); *H04L 41/0853* (2013.01)

(58) Field of Classification Search
None
See application file for complete search history.

(56) References Cited

U.S. PATENT DOCUMENTS

| | | | |
|---|---|---|---|
| 2013/0223279 A1* | 8/2013 | Tinnakornsrisuphap | H04W 4/80 370/254 |
| 2014/0023336 A1* | 1/2014 | Mast | H04N 5/765 386/200 |
| 2017/0324840 A1* | 11/2017 | Mathison | H04L 41/0672 |
| 2018/0054487 A1* | 2/2018 | Hebsur | H04L 67/12 |
| 2019/0138795 A1 | 5/2019 | Vaidya | |
| 2020/0014591 A1* | 1/2020 | Ito | H04L 41/0813 |

(Continued)

*Primary Examiner* — Brian Whipple
(74) *Attorney, Agent, or Firm* — Wolf, Greenfield & Sacks, P.C.; Joseph Pagnotta (57) ABSTRACT

The techniques described herein relate to methods, apparatus, and computer readable media configured to manage devices that are part of a telecommunications system. An image of a device that is part of a telecommunications system is obtained and transmitted to a first remote device. Data indicative of device-specific information for the device is received from the first remote device in response to transmitting the image, wherein the device-specific information comprises information associated with the telecommunications system. The device-specific information is displayed for the purpose selected from the group consisting of performing a management function associated with the device and monitoring a performance parameter associated with the device. Data indicative of a selection of the management function is received and transmitted to a second remote device.

20 Claims, 7 Drawing Sheets

(56) References Cited

U.S. PATENT DOCUMENTS

| | | | |
|---|---|---|---|
| 2020/0136924 A1* | 4/2020 | Roy | H04L 41/22 |
| 2020/0336394 A1* | 10/2020 | Mathur | H04L 41/0609 |

* cited by examiner

METHODS AND APPARATUS FOR MANAGING TELECOMMUNICATION SYSTEM DEVICES

CROSS-REFERENCE TO RELATED APPLICATIONS

This application claims priority under 35 U.S.C. § 119(e) to U.S. Provisional Application No. 62/926,246, filed Oct. 25, 2019, entitled "METHODS AND APPARATUS FOR MANAGING TELECOMMUNICATION SYSTEM DEVICES," and to U.S. Provisional Application No. 62/884,378, filed Aug. 8, 2019, entitled "METHODS AND APPARATUS FOR MANAGING TELECOMMUNICATION SYSTEM DEVICES," which are hereby incorporated by reference in their entirety.

TECHNICAL FIELD

The techniques described herein relate generally to managing devices in a telecommunication system, and particularly to determining device-specific information for the devices and executing management functions for the devices.

BACKGROUND OF INVENTION

While end-users of a telecommunication system may only physically see endpoint devices, such as the telephones themselves, the system includes various devices used to process and route calls between endpoints. Such devices include, for example, call routers, packet routers, edge devices, firewalls, load balancers, private resources (e.g., service provider databases, internal servers), and/or the like. In addition to these various devices, service providers allow customers to deploy hundreds or thousands of telephones (e.g., internet phones), and customers can deploy the telephones at different geographical locations. Additionally, different customers may deploy different devices and network configurations, which can make managing the telecommunications system challenging for the service providers, information technology (IT) managers, and other involved parties.

In order to manage telecommunications system devices (e.g., such as determining inventory of installed endpoint devices, trouble shooting, initiating updates, and/or reconfiguring the devices), the process is typically a manual and time-intensive process that is performed by trained personnel. Since the type of devices, number of devices, and/or other aspects of the system may not be known in advance, personnel must be physically present, manually identify each device, and figure out how to obtain desired information for each device. Further, the information available is typically limited just to the basic information stored for each device. This makes managing customer deployments extremely time intensive, cumbersome, and limited due to the fact that personnel can only access available information and therefore may not be able to obtain all desired information.

Managing telecommunications systems can be further complicated by the fact that each customer may use a specific, different set of services that are tailored to the unique needs and desires of each customer (e.g., which can vary across different geographical sites of the customer). Further, each customer may be interested in different types of usage data. For example, while a call center may be concerned with the number of calls made and/or received by each telephone, corporate customers may be most interested in the number of dropped calls and ensuring that each device is timely updated as new software or firmware becomes available.

What is needed is an improvement for managing various aspects (e.g., inventory control, provisioning, troubleshooting, performance monitoring and the like) of a telecommunications system.

SUMMARY OF INVENTION

In accordance with the disclosed subject matter, apparatus, systems, and methods are provided for managing telecommunication system devices, including determining device-specific information for the devices and coordinating execution of management functions for the devices.

Some embodiments relate to a system comprising a memory storing instructions, and a processor configured to execute the instructions to perform receiving, from a remote device, an image of a device that is part of a telecommunications system, processing the image to determine identifying information for the device, communicating with a public resource, a private resource, or both, using the identifying information, to determine data indicative of device-specific information for the device, wherein the device-specific information comprises information associated with the telecommunications system, transmitting, to the remote device, the identifying information, the device-specific information, or both, receiving data indicative of a selected management function from the remote device, and executing the selected management function.

According to some examples, processing the image comprises performing a computer vision analysis of the image to determine the identifying information. The processor can be configured to execute the instructions to perform processing the image based on a set of sample images, wherein each image in the set of sample images is an image of an associated device of the telecommunications system.

According to some examples, determining data indicative of the device-specific information for the device comprises receiving data from a set of databases, and examining the data, using a data mining technique, to generate the device-specific information.

According to some examples, determining the device-specific information regarding the device comprises receiving one or more of determining identifying information of the device, determining usage information for the device, and determining technical information for the device.

According to some examples, the identifying information of the device comprises one or more of a make of the device, a model of the device, or both, a manufacturer of the device, information regarding hardware of the device, a firmware version of firmware running on the device, a phone number associated with the device, a location of the device, a user of the device, a service provider of the device, a set of features associated with the device for the telecommunications system, and an address of the device. The address of the device can be an internet protocol (IP) address, a media access control (MAC) address, or both.

According to some examples, the usage information for the device comprises one or more of a set of calls made by the device, a set of calls received by the device, data indicative of call quality for calls associated with the device, and an average duration of the calls associated with the device.

According to some examples, the technical information for the device comprises one or more of a number of resets of the device, a duration of each of the resets of the device, a frequency of the resets of the device, a number of dropped calls associated with the device, upgrades associated with the device, work tickets associated with the device, and troubleshooting actions performed for the device.

According to some examples, executing the selected management function comprises executing one or more of a firmware upgrade function that upgrades firmware used by the device, a software upgrade function that upgrades software used by the device, a feature function that enables a feature for the device for the telecommunications system, disables the feature, or both, a test function that tests one or more features of the device, a test phone call function that places a test phone call to the device, a video recording function that records a video of an event associated with the device, a live support function that provides a live support session for the device, a geolocation verification function that analyzes the device based on whether a current geolocation of the managed device matches an originally provisioned geolocation of the device, a work ticket function that submits a work ticket for the device indicative of an action to be performed for the device, and a configuration function to configure one or more features of the device.

According to some embodiments, the device comprises a phone, a router, an edge device, a firewall, a call router, a load balancer, or some combination thereof.

Some embodiments relate to a computerized method for managing devices that are part of a telecommunications system. The method includes obtaining an image of a device that is part of a telecommunications system, transmitting the image to a first remote device, receiving, from the first remote device in response to transmitting the image, data indicative of device-specific information for the device, wherein the device-specific information includes information associated with the telecommunications system, displaying the device-specific information for the purpose selected from the group consisting of performing a management function associated with the device and monitoring a performance parameter associated with the device, receiving data indicative of a selection of the management function, and transmitting data indicative of the selected management function to a second remote device. Some embodiments relate to a non-transitory computer-readable media including instructions that, when executed by one or more processors on a computing device, are operable to cause the one or more processors to execute the method. Some embodiments relate to a system including a memory storing instructions, and a processor configured to execute the instructions to perform the method.

In some examples, the first remote device is different than the second remote device.

In some examples, receiving the device-specific information regarding the device includes receiving one or more of identifying information of the device, usage information for the device, and technical information for the device.

In some examples, the identifying information of the device includes one or more of a make of the device, a model of the device, or both, a manufacturer of the device, information regarding hardware of the device, a firmware version of firmware running on the device, a phone number associated with the device, a location of the device, a user of the device, a service provider of the device, a set of features associated with the device for the telecommunications system, and an address of the device. The address of the device can be an internet protocol (IP) address, a media access control (MAC) address, or both.

In some examples, the usage information for the device includes one or more of a set of calls made by the device, a set of calls received by the device, data indicative of call quality for calls associated with the device, and an average duration of the calls associated with the device.

In some examples, the technical information for the device includes one or more of a number of resets of the device, a duration of each of the resets of the device, a frequency of the resets of the device, a number of dropped calls associated with the device, upgrades associated with the device, work tickets associated with the device, and troubleshooting actions performed for the device.

In some examples, displaying the management function includes displaying one or more of a firmware upgrade function that upgrades firmware used by the device, a software upgrade function that upgrades software used by the device, a feature function that enables a feature for the device for the telecommunications system, disables the feature, or both, a test function that tests one or more features of the device, a test phone call function that places a test phone call to the device, a video recording function that records a video of an event associated with the device, a live support function that provides a live support session for the device, a geolocation verification function that analyzes the device based on whether a current geolocation of the managed device matches an originally provisioned geolocation of the device, a work ticket function that submits a work ticket for the device indicative of an action to be performed for the device, and a configuration function to configure one or more features of the device.

In some examples, the device includes a phone, a router, an edge device, a firewall, a call router, a load balancer, or some combination thereof.

Some embodiments relate to a non-transitory computer-readable media comprising instructions that, when executed by one or more processors on a computing device, are operable to cause the one or more processors to perform receiving, from a remote device, an image of a device that is part of a telecommunications system, processing the image to determine identifying information for the device, communicating with a public resource, a private resource, or both, using the identifying information, to determine data indicative of device-specific information for the device, wherein the device-specific information comprises information associated with the telecommunications system, transmitting, to the remote device, the identifying information, the device-specific information, or both, receiving data indicative of a selected management function from the remote device, and executing the selected management function.

Some embodiments relate to a computerized method for managing devices that are part of a telecommunications system. The method includes receiving, from a remote device, an image of a device that is part of a telecommunications system, processing the image to determine identifying information for the device, communicating with a public resource, a private resource, or both, using the identifying information, to determine data indicative of device-specific information for the device, wherein the device-specific information includes information associated with the telecommunications system, transmitting, to the remote device, the identifying information, the device-specific information, or both, receiving data indicative of a selected management function from the remote device, and executing the selected management function. Some embodiments relate to a non-transitory computer-readable media including instructions that, when executed by one or more processors on a computing device, are operable to cause the one or more processors to execute the method. Some embodiments relate to a system including a memory storing instructions, and a processor configured to execute the instructions to perform the method.

In some examples, processing the image includes performing a computer vision analysis of the image to determine the identifying information.

In some examples, the techniques further include processing the image based on a set of sample images, wherein each image in the set of sample images is an image of an associated device of the telecommunications system.

In some examples, determining data indicative of the device-specific information for the device includes receiving data from a set of databases, and examining the data, using a data mining technique, to generate the device-specific information.

In some examples, determining the device-specific information regarding the device includes receiving one or more of determining identifying information of the device, determining usage information for the device, and determining technical information for the device.

In some examples, the identifying information of the device includes one or more of a make of the device, a model of the device, or both, a manufacturer of the device, information regarding hardware of the device, a firmware version of firmware running on the device, a phone number associated with the device, a location of the device, a user of the device, a service provider of the device, a set of features associated with the device for the telecommunications system, and an address of the device. The address of the device can be an internet protocol (IP) address, a media access control (MAC) address, or both.

In some examples, the usage information for the device includes one or more of a set of calls made by the device, a set of calls received by the device, data indicative of call quality for calls associated with the device, and an average duration of the calls associated with the device.

In some examples, the technical information for the device includes one or more of a number of resets of the device, a duration of each of the resets of the device, a frequency of the resets of the device, a number of dropped calls associated with the device, upgrades associated with the device, work tickets associated with the device, and troubleshooting actions performed for the device.

In some examples, executing the selected management function includes executing one or more of a firmware upgrade function that upgrades firmware used by the device, a software upgrade function that upgrades software used by the device, a feature function that enables a feature for the device for the telecommunications system, disables the feature, or both, a test function that tests one or more features of the device, a test phone call function that places a test phone call to the device, a video recording function that records a video of an event associated with the device, a live support function that provides a live support session for the device, a geolocation verification function that analyzes the device based on whether a current geolocation of the managed device matches an originally provisioned geo-location of the device, a work ticket function that submits a work ticket for the device indicative of an action to be performed for the device, and a configuration function to configure one or more features of the device.

In some examples, the device includes a phone, a router, an edge device, a firewall, a call router, a load balancer, or some combination thereof.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

The techniques described herein provide for easily managing devices that are part of a telecommunications system. The techniques allow a novice user to use a mobile device, such as a phone or tablet device, to capture an image of a device in the network (e.g., desk phones, routers, etc.) and receive device-specific information for the device and/or a set of management functions available for the device. The mobile device can transmit the image to a remote server that automatically identifies the device in the image, and gathers and determines relevant device-specific information for the device in real-time from relevant data sources (e.g., public and/or private sources, including databases and other types of resources). The techniques can provide users with real-time visibility into their endpoints, aid in diagnostics and troubleshooting, aid in reconfiguration, and seamlessly gather customer analytics for further strategic use.

In some embodiments, the techniques can leverage artificial intelligence (AI) tools to perform one or more aspects. In some embodiments, the techniques can leverage computer vision techniques and/or image recognition techniques to identify a device in an image. For example, object recognition techniques and/or image segmentation techniques can be used to determine the device by determining the shape of the device in the image. As another example, computer vision techniques can be used to determine other identifying information from the images, such as text, symbols, logos and/or other features of the device. In some embodiments, the text can contain device serial numbers, device MAC ID information or other identifying information. In some embodiments, the techniques can leverage data mining techniques to determine device-specific information based on data collected from various database(s) and/or other source(s). Such data mining techniques can generate detailed information of the devices, such as usage information and enhanced technical information that would not otherwise be available.

In some embodiments, the techniques include determining management functions associated with the device, and allowing a user to invoke the management functions. For example, the techniques can include displaying a set of management functions on a user's mobile device, and allowing a user to invoke desired management functions simply by selecting the management functions on the user's mobile device. The mobile device can transmit information of the selected management functions to back-end servers that coordinate the execution of the management functions.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
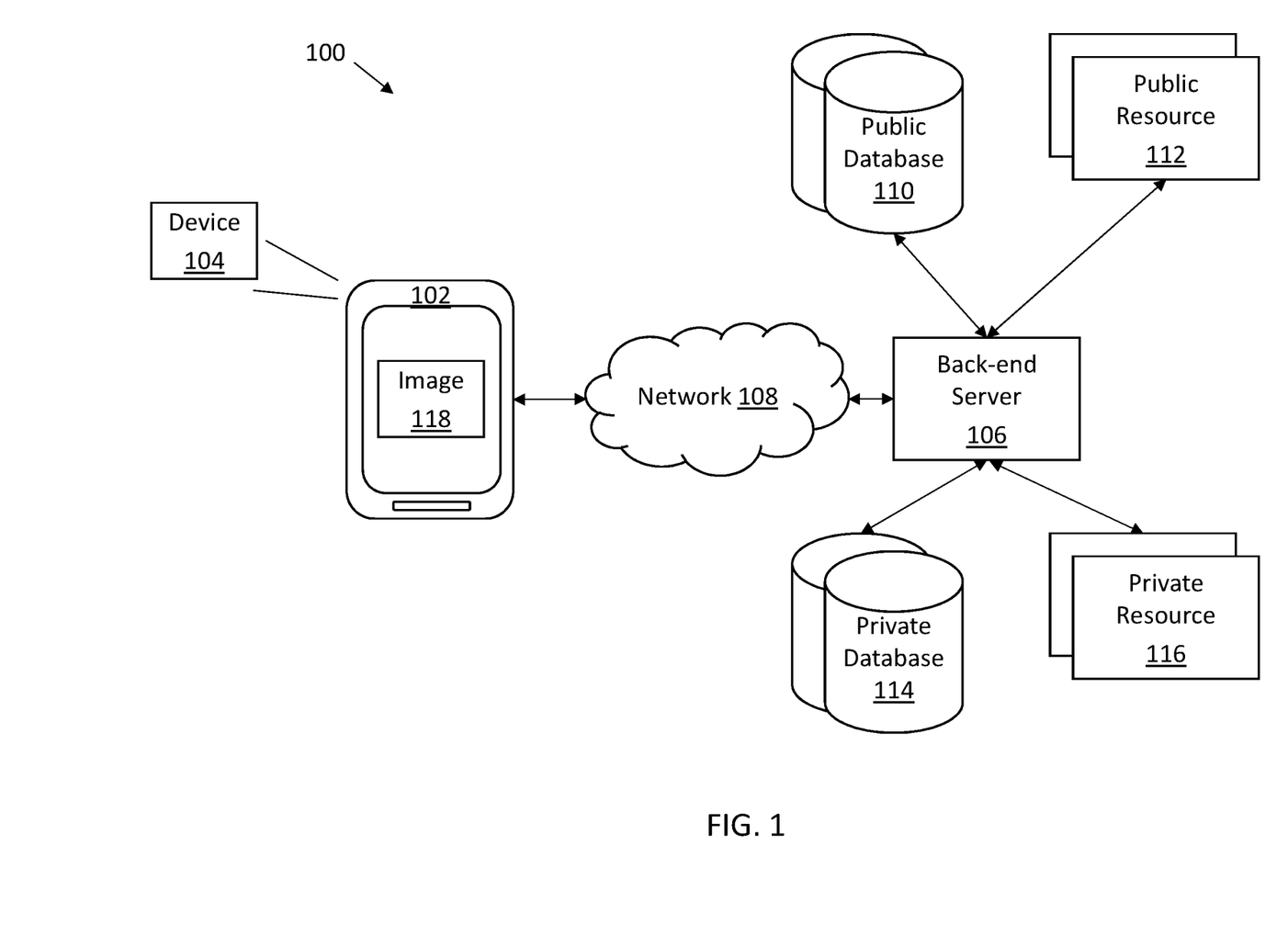
FIG. 1 is a diagram of an exemplary system for determining device-specific information, according to some embodiments.

FIG. 1 is a diagram of an exemplary system 100 for determining device-specific information, according to some embodiments. The system 100 includes a mobile device 102 configured to capture an image of a device 104. For example, the mobile device 102 can execute an application that opens a camera function on the mobile device. The mobile device 102 can be any mobile computing device, such as a smartphone, laptop, personal digital assistant, tablet device, and/or the like, capable of capturing an image 118 of device 104. In some embodiments, the device 104 is a device that is part of a telecommunications system. For example, the device 104 can be a phone, a facsimile machine, networked printer/copier/scanner or similar electronic imaging device, a router, an edge device, a firewall, a call router, a load balancer, and/or the like. For ease of explanation herein, in order to make reference to the imaged device from other devices and servers, the imaged device will be referred to as the managed device since the device 104 can be managed using the techniques described herein. However, it should be appreciated that use of the term "managed" does not imply characteristics of and/or limit the features of the device. The mobile device 102 communicates with back-end server 106 via network 108. The back-end server 106 is in communication with one or more public databases 110, one or more public resources 112, one or more private databases 114, and one or more private resources 116.

While only one device 104 is shown in FIG. 1, any number of devices 104 can communicate with the back-end server 106. For example, different customer employees and/or service provider employees (where the service provider provides the back-end server and/or aspects of the telecommunications system) can each use their own associated device 104 to communicate with the back-end server 106. In some embodiments, the techniques can provide capabilities for one device to display and/or share the same information displayed on one device to another remote device. For example, such capabilities can be useful to share a display or a user interface with a local IT administrator, a helpdesk member, and/or the like. The back-end server 106 can be any computing device configured to perform the computerized methods described herein, such as a web server, a database server, a set of distributed computing devices, one or more cloud computing devices, one or more virtual machines, and/or the like.

Figure 2:
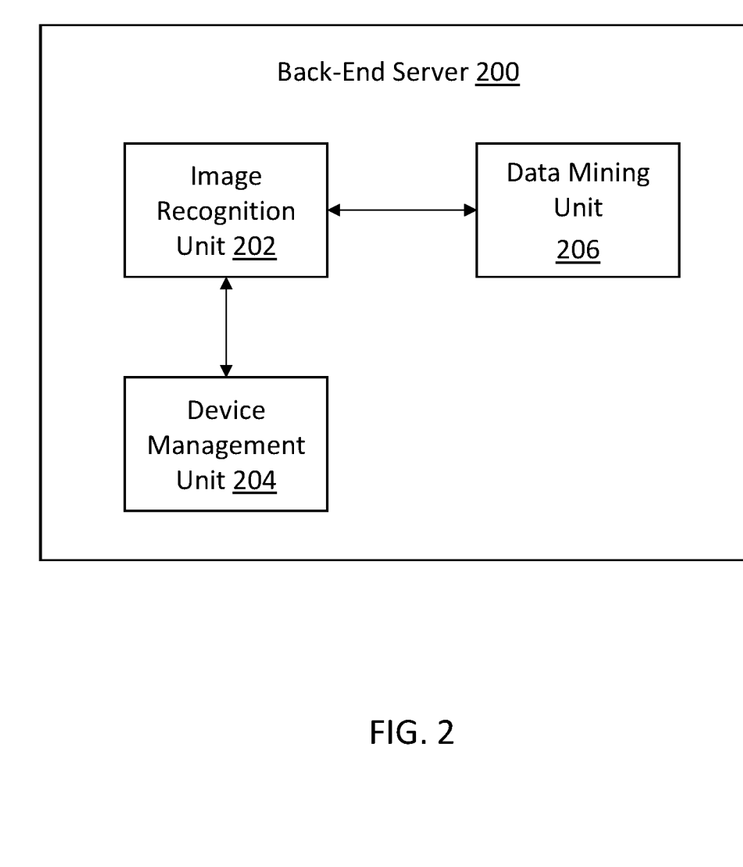
FIG. 2 is a diagram of an exemplary back-end server for determining device-specific information, according to some embodiments.

FIG. 2 is a diagram of an exemplary back-end server 200 for determining device-specific information, according to some embodiments. The back-end server 200 is an example of back-end server 106. The back-end server 200 includes an image recognition unit 202, a device management unit 204, and a data mining unit 206. The image recognition unit 202 identifies the managed device 104 in an image. As described further herein, the techniques can use image recognition techniques and/or computer vision techniques to identify a device (or multiple devices) in an image. In some embodiments, the techniques can include using a dataset of images to accurately identify the managed device 104. The device management unit 204 coordinates executing management functions for the managed devices, as discussed further in conjunction with FIG. 5. The data mining unit 206 uses data mining techniques to determine device-specific information from data collected for managed devices. As described herein, the data can be obtained from various public and/or private data sources, such as databases and/or resources within a service provider of aspects of the telecommunications system.

Referring to the private databases 114 and private resources 116, such private data sources can include customer relationship management (CRM) services that manage business relationships for users of the service and the data and information associated with them, monitoring services that monitor devices in the telecommunications system, ticketing services that organize service and maintenance of the devices in the telecommunications system, provisioning services used to set up and maintain devices in the telecommunications system, and/or other services that may be offered by companies that provide services for the telecommunications system, such as Vonage.

Figure 3:
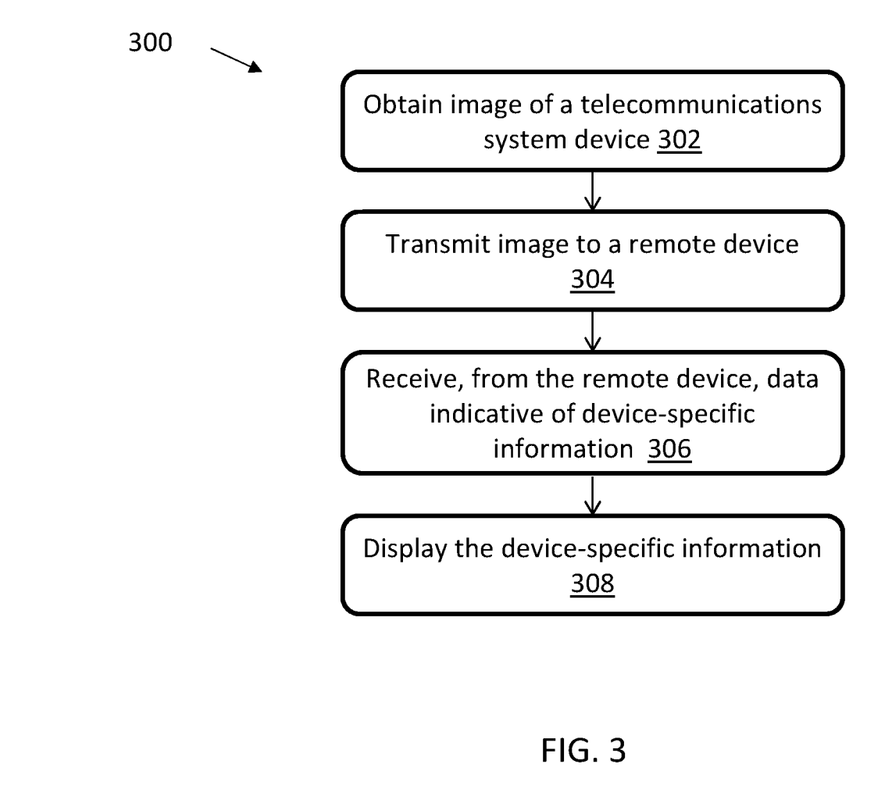
FIG. 3 is a flow chart showing an exemplary computerized method for obtaining device-specific information on a mobile device, according to some embodiments.

FIG. 3 is a flow chart showing an exemplary computerized method 300 for obtaining device-specific information on a mobile device, according to some embodiments. For example, the mobile device 102 can execute the computerized method 300 by executing an application contained therein. As another example, the method 300 can be provided as part of a client application or service of the telecommunications network, such as part of cloud deployments, such as the Vonage Business Cloud, and/or as part of an application that integrates mobile devices with business phones and/or applications, such as Vonage Mobile Connect.

At step 302, the mobile device 102 obtains an image of a managed device that is part of a telecommunications system, such as device 104 in FIG. 1. At step 304, the mobile device transmits the image of the managed device to a first remote device, such as the back-end server 106 shown in FIG. 1. At step 306, the mobile device 102 receives, from the first remote device in response to the transmitted image, device-specific information for the managed device. At step 308, the mobile device displays the device-specific information.

Referring to step 306, the device-specific information can include any information that is specific to the managed device, such as identifying information of the device, usage information for the device, and/or technical information for the device. In some embodiments, the device-specific information can include information associated with the telecommunications system. The types of device-specific information may be different depending on the device. For example, if the device is a phone, the information may include information about the calls made, calls received, call time, and/or the like. If the device is a router, the information may be related to network status/performance, the packet flows, the types of data being handled by the router, congestion, data loss, and/or other information relevant to routers.

In some embodiments, the identifying information of the managed device can include one or more of a make of the managed device, a model of the managed device, or both. In some embodiments, the identifying information of the managed device can include a manufacturer of the managed device, information regarding the hardware of the managed device, a firmware version of firmware running on the managed device, a phone number associated with the managed device (e.g., if the device includes phone functionality), a location of the managed device (e.g., a geographical location of the device, including an originally provisioned location of the device, a current location of the device, and/or the like), a user of the managed device (e.g., a customer associated with the device and/or a user of the customer associated with the device), a service provider of the managed device (e.g., a service provider that provides phone functionality of the device if the device has phone capabilities), a set of features associated with the managed device for the telecommunications system (e.g., whether the device supports dialing internal extensions within the customer, or requires the user to dial an entire number), and/or an address of the managed device (e.g., an internet protocol (IP) address, a media access control (MAC) address, and/or the like).

In some embodiments, the usage information for the device can include one or more of a set of calls made by the managed device (e.g., a number of calls for a certain time period, such as the past 24 hours, 48 hours, week, year, and/or the like), a set of calls received by the managed device (e.g., a number of calls received for a certain time period), data indicative of call quality for calls associated with the managed device, and/or an average duration of the calls associated with the managed device (e.g., the average duration of made calls and/or received calls).

In some embodiments, the technical information can include one or more of a number of resets of the managed device (e.g., such as a number of resets for a certain time period), a duration of each of the resets of the managed device, a frequency of the resets of the managed device, a number of dropped calls associated with the managed device (e.g., such as a number of dropped calls for a certain time period), a number of upgrades associated with the managed device, any past and/or current work tickets associated with the managed device, and/or any troubleshooting actions performed for the managed device. The resets can include a reboot of the device, a factory reset of default configuration settings for the device, and/or the like. In some embodiments, the technical information can also include information for provisioning events, such as device configuration updates, firmware updates, and/or the like.

Referring to step 308, in some embodiments the mobile device can display a set of one or more management functions. The management functions can be associated with the managed device (e.g., device 104) and/or a telecommunications system that the device is part of and/or associated with. The management functions can include, for example, one or more of a firmware upgrade function that upgrades firmware used by the managed device, a software upgrade function that upgrades software used by the managed device, a feature function that enables and/or disables a feature for the managed device for the telecommunications system (e.g., enables or disables four-digit extension dialing), a test function that tests one or more features of the managed device, a work ticket function that submits a work ticket for the managed device indicative of an action to be performed for the managed device, and/or a configuration function to configure one or more features of the managed device.

In some embodiments, the management functions can include a test phone call function. The test phone call function can be incorporated as a clickable button (e.g., as described further in conjunction with FIG. 4), which can be invoked by the mobile device to place a call to the managed device. The test phone call function can allow, for example, a user to easily conduct a test of the managed device on the fly (e.g., simply by pressing one button) to confirm connectivity of the device.

Figure 7:
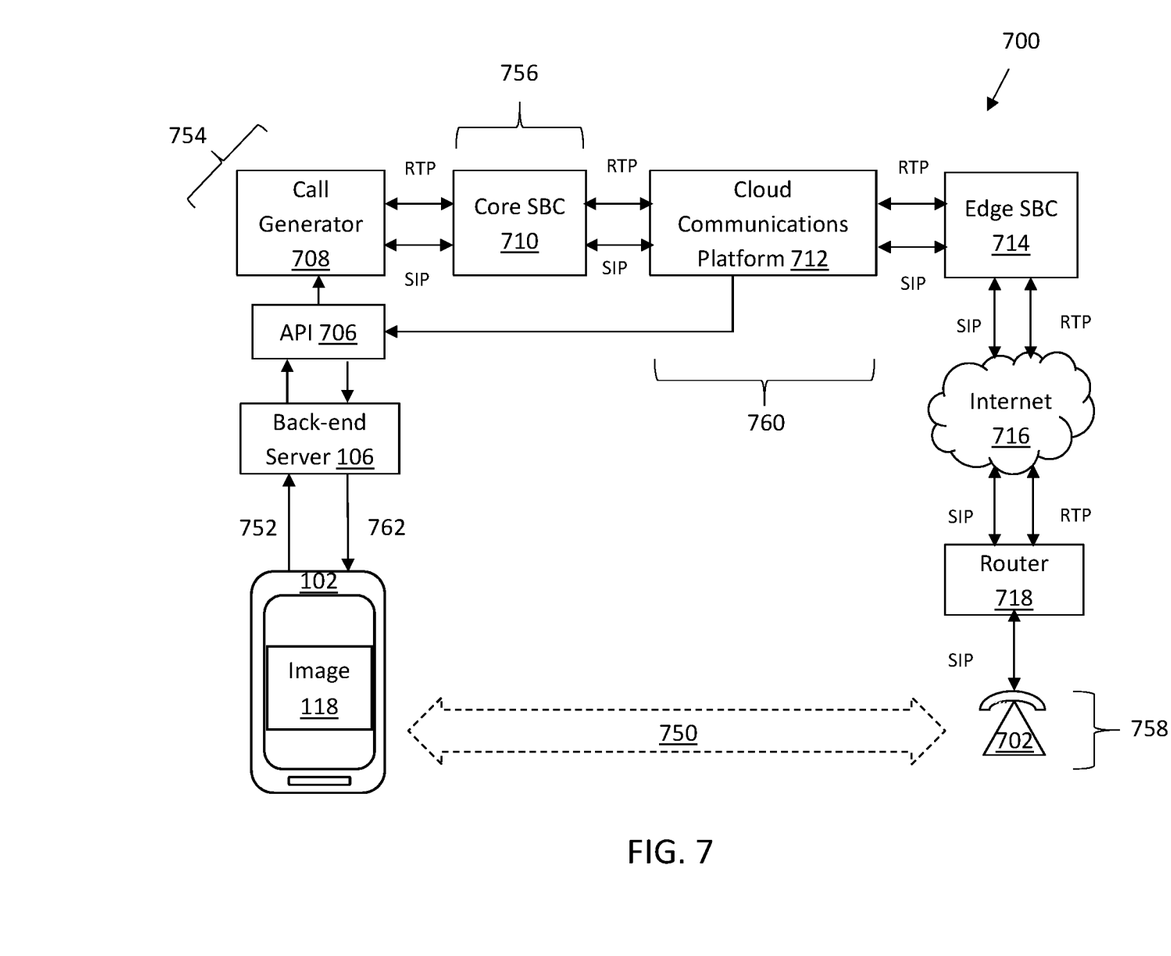
FIG. 7 is a diagram of an exemplary loopback call setup process, according to some embodiments.

In some embodiments, the test phone call function can include conducting an audio loopback to test and monitor the call audio, which can ultimately be transmitted back to the mobile device. FIG. 7 is a diagram of an exemplary loopback call setup process 700 and system components for executing same, according to some embodiments. As described herein, at 750 a user can use the mobile device 102 to capture an image 118 of a managed device, which in this example is a voice over IP (VoIP) phone 702. The application running on the mobile device can use the image 118 to retrieve information about the VoIP phone 702, such as the make, model and MAC address of the VoIP phone, and can retrieve relevant data about the phone from an API 706 through the back-end server 106. At 752, a user invokes a test call through the mobile device 102 (e.g., by pressing a test call button), which can initiate a request to the call generator 708 through the back-end server 106 and API 706 to initiate a call to the phone number associated with the VoIP phone. At 754, the call generator 708 initiates a test call to the phone number associated with the VoIP phone 702.

At 756, a core session border controller (SBC) 710 inserts loopback attributes into the test call's session initiation protocol (SIP) INVITE session description protocol (SDP) message (e.g., a=loopback:rtp-media-loopback and a=loopback-source). As shown, the core SBC 710, a cloud communications platform 712, an edge SBC 714, a global computer network (i.e., the Internet 716), and a router 718 can communicate among each other using the well-known and established Internet Engineering Task Force (IETF) protocols Session Initiation Protocol (SIP) and Real Time Transport Protocol (RTP). The SIP INVITE is routed through the cloud communications platform 712 and Edge SBC 714 over the Internet 716/router 718 to the VoIP phone 702. At 758, the VoIP phone 702 receives the SIP INVITE with the loopback attributes and auto-answers the test call, and loops back the audio stream back to the call generator 708. At 760, the communication platform 712 captures desired call metrics, such as call quality metrics. At 762, once the call is concluded, the call metrics are available in the communication platform's 712 data store, which are retrieved by the mobile device 102 through the back-end server 106 and the API 706 to provide the mobile device with real-time call quality metrics related to the test call.

In some embodiments, the management functions can include a video recording function that allows a user to record video of an event associated with the managed device. For example, a user can record the process of rebooting a phone, plugging in and/or unplugging a cable (e.g., a network cable or a power cable), and/or the like. As another example, a user can record data, such as diagnostic data, displayed by the display unit of the device. As a further example, a user can record problems with a device, such as a phone that is continuously rebooting (e.g., because of a software issue). As another example, a user can capture a short sequence of user actions that indicates as issue. For example, a user can record the process of receiving a call while on another call, switching to the new call, then trying to switch back to the original call, which fails.

The videos can be used for various purposes, such as to supplement a work ticket, for machine learning purposes, and/or to identify devices. For example, the back-end server and/or another computing device can use machine learning techniques to process captured video recordings to determine whether there are patterns to various problem(s), such as patterns based on a phone type, geographical location (e.g., LAN location, customer location), and/or the like. For example, machine learning techniques can be used to recognize objects in the videos, such as devices, buttons, screen text, and/or the like. once sequenced, can be compared to other videos for similar sequences to see if the problem is unique to one device/customer or is occurring more widely in the customer base. As another example, as new managed devices are captured by the mobile device, videos associated with those devices can be added to a library of known devices. For example, video analysis can be used to determine if the device in the video is one in the system's existing library, or whether it is a new device. Advantageously, videos can be used to expand the managed device inventory for the system, including to automatically add new managed devices through user interaction.

In some embodiments, the managed functions can include a live support function that allows a user to perform live support, on the fly, for the device. For example, a user can click a live support button to connect to a helpdesk using a chat, voice and/or video session. In some embodiments, information regarding the managed device, such as identifying information, usage information, and/or technical information, can be automatically provided to the helpdesk in order to facilitate the live support session. When a user invokes live support, the system can create a work ticket, which can include relevant information about the user and the associated device. The customer service representative can reference the work ticket when interacting with customer on a chat, video and/or voice communication session.

In some embodiments, the management functions can include a geolocation verification function that determines whether action is necessary for the managed device based on whether the current geolocation of the managed device matches an originally provisioned geolocation for the device. As described herein, the identifying information for a managed device can include geographical location data, including an originally provisioned location of the device, a current location of the device, and/or the like. In some embodiments, a management function can be configured to compare a managed devices' original provisioned location with the device's current location. For example, a management function can obtain data regarding an originally provisioned location for the managed device and compare it to geolocation data associated with an image captured of the managed device. The locations may not match for a number of reasons, such as due to an incorrect initial installation and/or due to the managed device being moved to a different location. Such location miss-matches can cause potential technical issues with the managed device. For example, certain services, such as enhanced 911 (E911) services, may not provide accurate location information where emergency services are requested and therefore require correction.

Depending on the geolocation techniques, the geolocation data can be accurate within a certain resolution, such as up to 100-200 feet in latitudinal and longitudinal directions for geolocations determined based on captured images. In some embodiments, the geolocation techniques can be supplemented to further refine the resolution and/or to provide z-axis resolution (e.g., to determine whether a captured device is on a different floor of a building than originally provisioned/installed).

Figure 4:
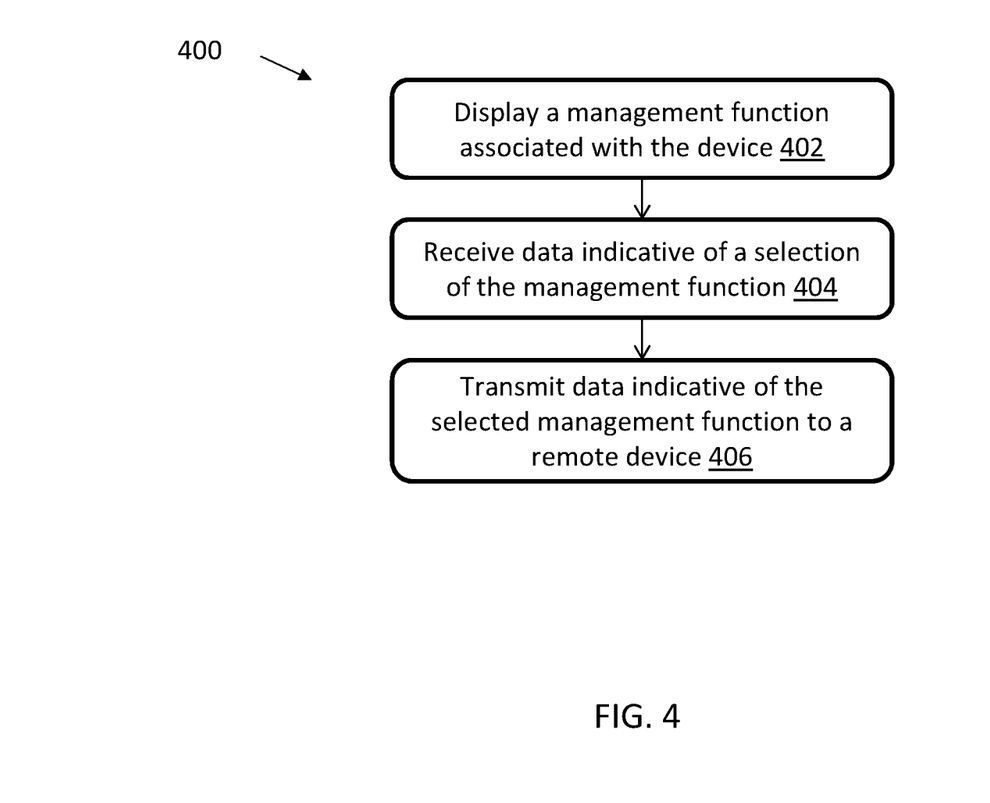
FIG. 4 is a flow chart showing an exemplary computerized method for invoking a management function for a device, according to some embodiments.

The mobile device can invoke the management functions using the mobile device. FIG. 4 is a flow chart showing an exemplary computerized method 400 for invoking a management function for a device, according to some embodiments. At step 402, the mobile device displays the one or more management functions. At step 404, the mobile device receives data indicative of a selection of the management function. For example, the management functions can be displayed as a set of clickable buttons, such that a user can select a management function by using a touchscreen display, a cursor, mouse, etc. to select the button associated with the desired management function. As another example, the management functions can be displayed as a list or in a drop-down menu, such that a user can select a desired management function by selecting it from the list.

At step 406, the mobile device transmits data indicative of the selected management function to a remote device configured to perform and/or coordinate performing the selected management function with other computing devices. In some embodiments, the remote device is the same device that determined the device-specific information and/or the management functions, such as the back-end server 106. In some embodiments, the remote device can be a different device.

Figure 5:
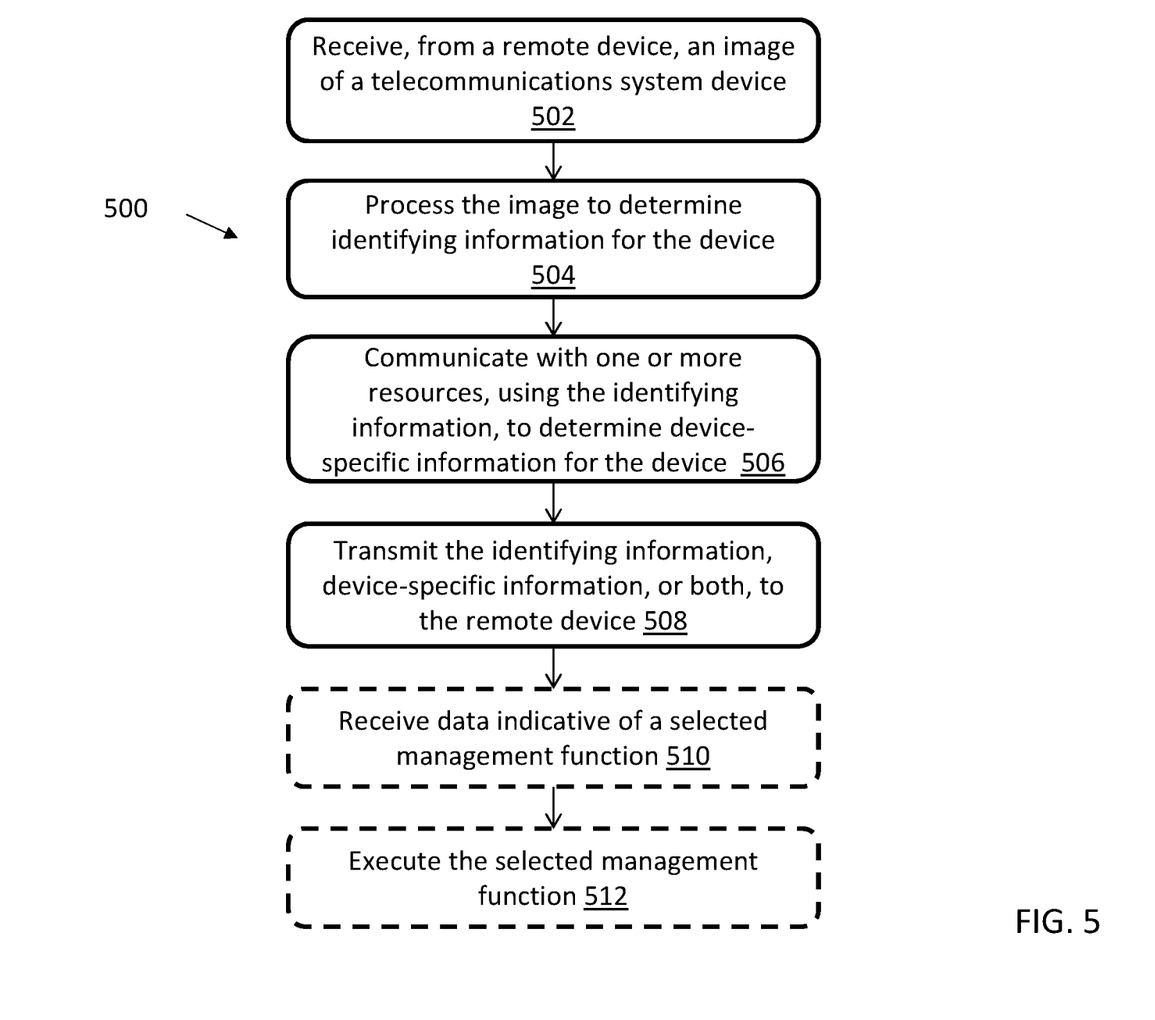
FIG. 5 is a flow chart showing an exemplary computerized method for determining device-specific information, according to some embodiments.

FIG. 5 is a flow chart showing an exemplary computerized method 500 for determining device-specific information and managing devices that are part of a telecommunications system, according to some embodiments. The method 500 can be performed by, for example, a server such as the back-end server 106 in FIG. 1. At step 502, the server receives, from a remote device (e.g., from a mobile device, such as device 102), an image of a managed device (e.g., device 104) that is part of a telecommunications system. At step 504, the server processes the image to determine identifying information for the managed device. At step 506, the server communicates with a public resource, a private resource, or both, using the identifying information, to determine data indicative of device-specific information for the managed device. In some embodiments, the device-specific information comprises information associated with the telecommunications system as described herein. For example, the device-specific information can include usage information for the managed device, and/or technical information for the device. At step 508, the server transmits, to the remote device, the identifying information, the device-specific information, or both.

The server can optionally execute a management function for the managed device. At step 510, the server receives data indicative of a selected management function from the remote device. At step 512, the server executes the selected management function.

Referring to step 504, the server can use computer vision techniques and/or image recognition techniques to identify a device in an image. In some embodiments, the server can determine the shape of the device using object recognition techniques and/or image segmentation techniques that match an identified object in the image to objects in a set of sample images of various devices in the telecommunications system. In some embodiments, computer vision techniques can be used to determine other identifying information from the images, such as text, symbols, logos and/or other features of the device.

Referring to step 506 and FIG. 1, the back-end server 106 can communicate with one or more of the public databases 110, the public resources 112, the private databases 114, and/or the private resources 116 to determine the device-specific information for the managed device. The public databases and resources can include, for example, device vendor resources (e.g., such as public web sites and/or databases that provide information for devices manufactured by the vendor), customer resources, and/or the like. The private databases and resources can include internal resources used and/or provided by the service provider.

In some embodiments, the remote device can determine the device-specific information in different levels of detail, using each level and/or levels to build on the information that can be determined in the next level. For example, the remote device can be configured to obtain identifying information for the managed device from public and/or private sources. In some embodiments, the server can process the identifying information using data mining techniques to generate identifying information not otherwise available from the typically basic information stored for telecommunication system devices. For example, the server can integrate the identifying information with location information to identify a user of the device. For example, the mobile device can transmit location information in addition to the image to the back-end server. The back-end server can use the location information to determine a building address associated with the location, and then determine businesses that occupy that building. The back-end server can check the businesses in the building against customer relationship management (CRM) data to identify the customer and/or specific user associated with the device.

In some embodiments, the server can use the identifying information of the managed device to determine usage information. In some embodiments, data mining techniques can be used to determine the usage information. For example, for a phone, the identifying information (e.g., what device represents, the service provider, hardware, firmware, and/or the like) can be used to determine call detail record (CDR) and/or other device-specific usage information. CDRs can include information detailing calls and/or other transactions handled by the device. For example, the usage information can include information that there were X number of calls in last Y hours, and no service tickets. Other examples can include providing further call statistics, such as the average duration of the X calls, the average time of the calls, the average time between calls, and/or the like. As another example, for an edge device, then the identifying information can be used to determine device-specific information relevant to the edge device, such as processing information, throughput information, average capacity over time, and/or the like.

In some embodiments, the server can use the identifying information and/or usage information to determine deeper technical information and/or statistics, such as the technical information described herein. For example, the server can determine technical information such as the number of resets and/or duration of the resets of the device, how often the device is reset, information regarding any dropped calls associated with the device, recent upgrades, and/or the like.

It should be appreciated that while the techniques can include processing the data in a tiered manner as described herein, the techniques are not limited to determining some types of device-specific information based on other types of device specific information. For example, the server can include one or more databases with device-specific information already determined for a managed device, and therefore the remote device may not need to determine the information, and/or the remote device can use the locally stored information to determine other device-specific information. As another example, the server may be able to determine the desired device-specific information based on the initial data obtained from public and/or private resources.

Figure 6:
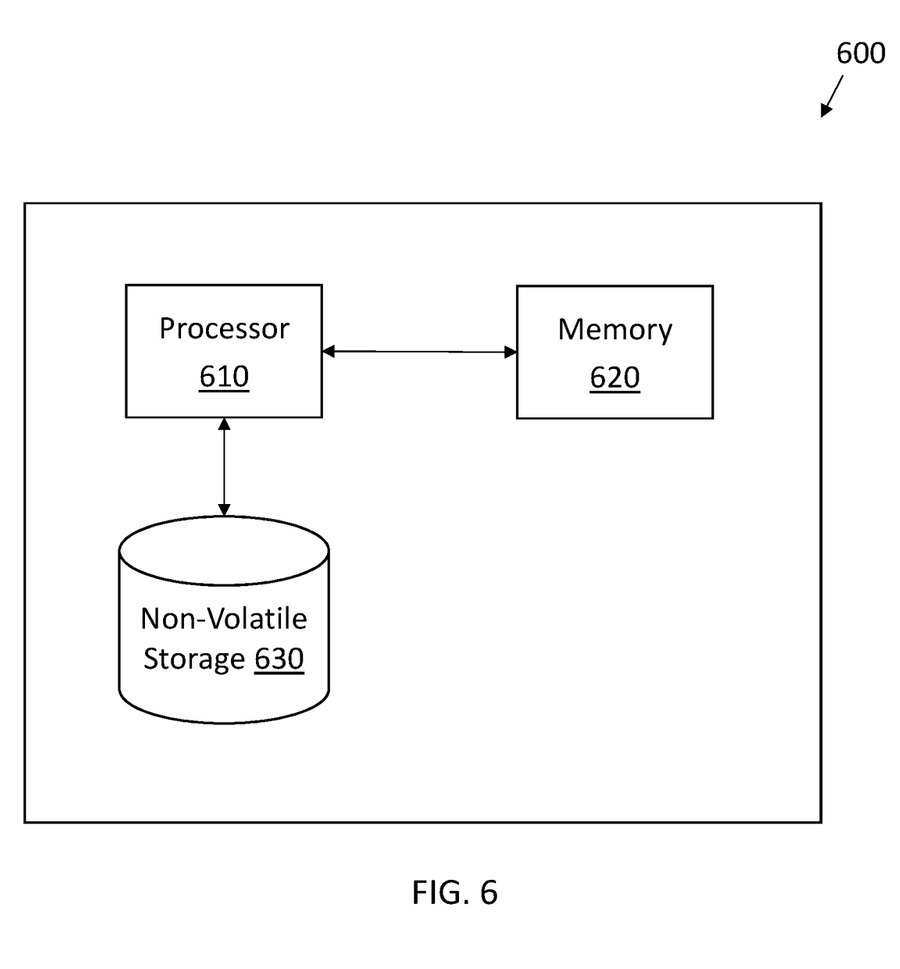
FIG. 6 is a diagram of an exemplary computerized apparatus that can perform the techniques described herein, according to some embodiments.

An illustrative implementation of a computer system 600 that may be used to perform any of the aspects of the techniques and embodiments disclosed herein is shown in FIG. 6. The computer system 600 may include one or more processors 610 and one or more non-transitory computer-readable storage media (e.g., memory 620 and one or more non-volatile storage media 630). The processor 610 may control writing data to and reading data from the memory 620 and the non-volatile storage device 630 in any suitable manner, as the aspects of the invention described herein are not limited in this respect. To perform functionality and/or techniques described herein, the processor 610 may execute one or more instructions stored in one or more computer-readable storage media (e.g., the memory 620, storage media, etc.), which may serve as non-transitory computer-readable storage media storing instructions for execution by the processor 610.

In connection with techniques described herein, code used to implement the techniques described herein for managing devices in a telecommunications network may be stored on one or more computer-readable storage media of computer system 600. Processor 610 may execute any such code to provide any techniques for managing devices as described herein. Any other software, programs or instructions described herein may also be stored and executed by computer system 600. It will be appreciated that computer code may be applied to any aspects of methods and techniques described herein. For example, computer code may be applied to interact with an operating system to manage devices through conventional operating system processes.

The various methods or processes outlined herein may be coded as software that is executable on one or more processors that employ any one of a variety of operating systems or platforms. Additionally, such software may be written using any of numerous suitable programming languages and/or programming or scripting tools, and also may be compiled as executable machine language code or intermediate code that is executed on a virtual machine or a suitable framework.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in non-transitory computer-readable storage media in any suitable form. Data structures may have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more methods, of which examples have been provided. The acts performed as part of a method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This allows elements to optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

Various aspects are described in this disclosure, which include, but are not limited to, the following aspects.

What is claimed is:

1. A system comprising a memory storing instructions, and a processor configured to execute the instructions to perform:
    receiving, from a remote device, an image of a device that is part of a telecommunications system;
    processing the image to determine identifying information for the device;
    communicating with a public resource, a private resource, or both, using the identifying information, to determine data indicative of device-specific information for the device, wherein the device-specific information comprises information associated with the telecommunications system;
    transmitting, to the remote device, the identifying information, the device-specific information, or both;
    receiving data indicative of a selected management function from the remote device; and
    executing the selected management function.

2. The system of claim 1, wherein processing the image comprises performing a computer vision analysis of the image to determine the identifying information.

3. The system of claim 2, wherein the processor is configured to execute the instructions to perform processing the image based on a set of sample images, wherein each image in the set of sample images is an image of an associated device of the telecommunications system.

4. The system of claim 1, wherein determining data indicative of the device-specific information for the device comprises:
    receiving data from a set of databases; and
    examining the data, using a data mining technique, to generate the device-specific information.

5. The system of claim 1, wherein determining the device-specific information regarding the device comprises receiving one or more of:
    determining identifying information of the device;
    determining usage information for the device; and
    determining technical information for the device.

6. The system of claim 5, wherein the identifying information of the device comprises one or more of:
    a make of the device, a model of the device, or both;
    a manufacturer of the device;
    information regarding hardware of the device;
    a firmware version of firmware running on the device;
    a phone number associated with the device;
    a location of the device;
    a user of the device;
    a service provider of the device;
    a set of features associated with the device for the telecommunications system; and
    an address of the device.

7. The system of claim 6, wherein the address of the device is an internet protocol (IP) address, a media access control (MAC) address, or both.

8. The system of claim 5, wherein the usage information for the device comprises one or more of:
    a set of calls made by the device;
    a set of calls received by the device;
    data indicative of call quality for calls associated with the device; and
    an average duration of the calls associated with the device.

9. The system of claim 5, wherein the technical information for the device comprises one or more of:
    a number of resets of the device;
    a duration of each of the resets of the device;
    a frequency of the resets of the device;
    a number of dropped calls associated with the device;
    upgrades associated with the device;
    work tickets associated with the device; and
    troubleshooting actions performed for the device.

10. The system of claim 1, wherein executing the selected management function comprises executing one or more of:
    a firmware upgrade function that upgrades firmware used by the device;
    a software upgrade function that upgrades software used by the device;
    a feature function that enables a feature for the device for the telecommunications system, disables the feature, or both;
    a test function that tests one or more features of the device;
    a test phone call function that places a test phone call to the device;
    a video recording function that records a video of an event associated with the device;
    a live support function that provides a live support session for the device;
    a geolocation verification function that analyzes the device based on whether a current geolocation of the managed device matches an originally provisioned geolocation of the device;
    a work ticket function that submits a work ticket for the device indicative of an action to be performed for the device; and
    a configuration function to configure one or more features of the device.

11. The system of claim 1, wherein the device comprises a phone, a router, an edge device, a firewall, a call router, a load balancer, or some combination thereof.

12. A computerized method for managing devices that are part of a telecommunications system, the method comprising:
    receiving, from a remote device, an image of a device that is part of a telecommunications system;
    processing the image to determine identifying information for the device;
    communicating with a public resource, a private resource, or both, using the identifying information, to determine data indicative of device-specific information for the device, wherein the device-specific information comprises information associated with the telecommunications system;
    transmitting, to the remote device, the identifying information, the device-specific information, or both;
    receiving data indicative of a selected management function from the remote device; and
    executing the selected management function.

13. The computerized method of claim 12, wherein processing the image comprises performing a computer vision analysis of the image to determine the identifying information.

14. The computerized method of claim 13, further comprising processing the image based on a set of sample images, wherein each image in the set of sample images is an image of an associated device of the telecommunications system.

15. The computerized method of claim 12, wherein determining data indicative of the device-specific information for the device comprises:
    receiving data from a set of databases; and
    examining the data, using a data mining technique, to generate the device-specific information.

16. The computerized method of claim 12, wherein determining the device-specific information regarding the device comprises receiving one or more of:
    determining identifying information of the device;
    determining usage information for the device; and
    determining technical information for the device.

17. The computerized method of claim 16, wherein the identifying information of the device comprises one or more of:
    a make of the device, a model of the device, or both;
    a manufacturer of the device;
    information regarding hardware of the device;
    a firmware version of firmware running on the device;
    a phone number associated with the device;
    a location of the device;
    a user of the device;
    a service provider of the device;
    a set of features associated with the device for the telecommunications system; and
    an address of the device.

18. The computerized method of claim 17, wherein the address of the device is an internet protocol (IP) address, a media access control (MAC) address, or both.

19. The computerized method of claim 12, wherein executing the selected management function comprises executing one or more of:
    a firmware upgrade function that upgrades firmware used by the device;
    a software upgrade function that upgrades software used by the device;

a feature function that enables a feature for the device for the telecommunications system, disables the feature, or both;

a test function that tests one or more features of the device;

a test phone call function that places a test phone call to the device;

a video recording function that records a video of an event associated with the device;

a live support function that provides a live support session for the device;

a geolocation verification function that analyzes the device based on whether a current geolocation of the managed device matches an originally provisioned geolocation of the device;

a work ticket function that submits a work ticket for the device indicative of an action to be performed for the device; and a configuration function to configure one or more features of the device.

20. A non-transitory computer-readable media comprising instructions that, when executed by one or more processors on a computing device, are operable to cause the one or more processors to perform:

receiving, from a remote device, an image of a device that is part of a telecommunications system;

processing the image to determine identifying information for the device;

communicating with a public resource, a private resource, or both, using the identifying information, to determine data indicative of device-specific information for the device, wherein the device-specific information comprises information associated with the telecommunications system;

transmitting, to the remote device, the identifying information, the device-specific information, or both;

receiving data indicative of a selected management function from the remote device; and executing the selected management function.

* * * * *